Nov. 16, 1948.    C. B. SPASE    2,453,945
FRICTION CLUTCH
Filed Feb. 12, 1945
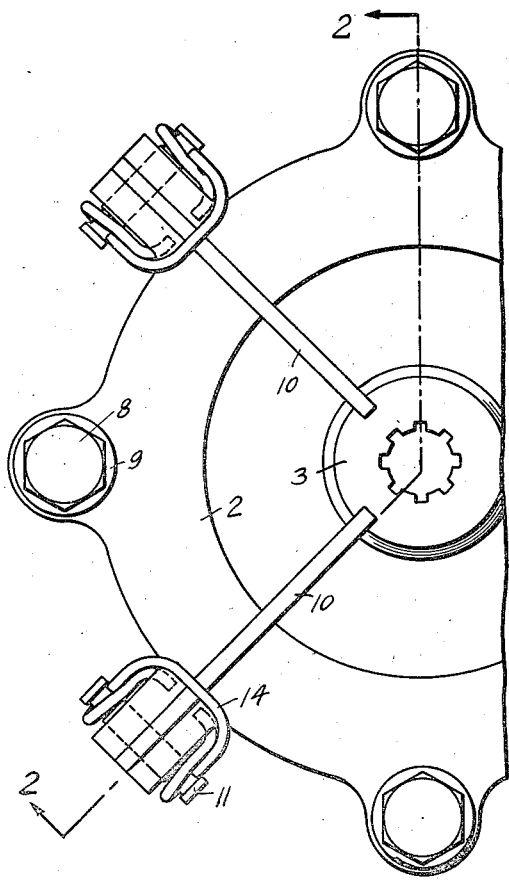
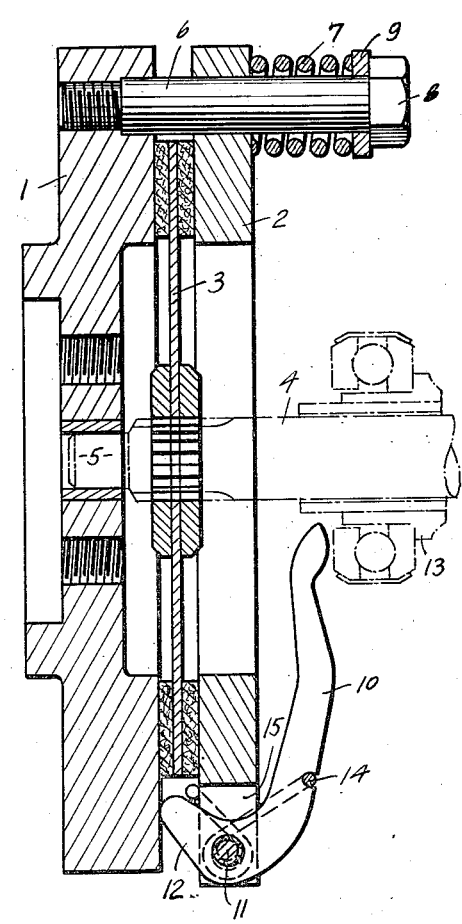
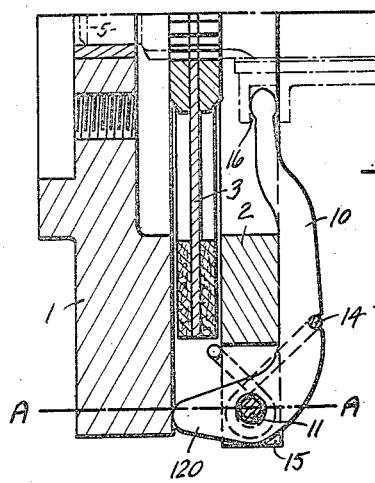
INVENTOR:
Charles B. Spase,
BY
Bodell & Thompson
ATTORNEYS.

Patented Nov. 16, 1948

2,453,945

UNITED STATES PATENT OFFICE 2,453,945

FRICTION CLUTCH

Charles B. Spase, Nedrow, N. Y., assignor to Line-Rollway Corporation, Syracuse, N. Y., a corporation of New York Application February 12, 1945, Serial No. 577,406

1 Claim. (Cl. 192—68)

This invention relates to friction clutches, and has for its object a clutch which is particularly simple and economical in construction and consists of a minimum number of parts, and more specifically, a clutch in which the pressure plate, the support therefor by which it is attached to a complemental element, which is usually the flywheel of an engine or a disk on a shaft driven by the engine, the clutch spring means and the throw-out levers are a unitary structure applicable as a unit to the flywheel or an analogous part, the clutch levers slidably engaging the flywheel or analogous part and being separable therefrom.

The invention consists in the novel features and in the combinations and constructions hereinafter set forth and claimed.

In describing this invention, reference is had to the accompanying drawings, in which like characters designate corresponding parts in all the views.

Figure 1 is a fragmentary rear elevation of this clutch, the throw-out collar and clutch shaft being removed.

Figure 2 is a sectional view taken on the plane of line 2—2, Figure 1, the clutch shaft and throw-out collar being shown in broken lines.

Figure 3 is a fragmentary view illustrating a modification of the clutch levers, whereby they move through a center line into self-locking position to hold the clutch disengaged.

The unitary clutch element comprises a pressure ring, means for attaching the pressure ring to the flywheel or analogous part, which constitutes a complemental element of the clutch, springs carried by the supporting means and thrusting in opposite directions against the pressure ring and the supporting means to press the pressure ring against the driven element or plate and engage the clutch by compressing the disk or plate between the pressure ring and the flywheel or analogous part, and throw-out means including parts carried by the pressure ring and also thrusting against but being separable from the flywheel or analogous part when operated to disengage the clutch.

1 designates one element or one section, as the driving section, of a clutch, which is usually the flywheel of an engine. 2 designates the pressure ring of the unitary clutch element, and 3 a friction disk or plate, which is usually the driven section of the clutch, it being usually splined on a clutch shaft 4 axially alined with the flywheel or the drive shaft and mounted in any suitable manner, it being shown as having the usual pilot bearing at 5 in the flywheel.

The supporting means of the unitary structure is here shown as including a series of studs 6 extending through openings in the pressure ring 2 and threading into the flywheel, the pressure ring being slidable on the studs. The supporting means may be a shell or housing with which the pressure ring is interlocked and by which it is supported from the flywheel.

7 designates the springs for pressing the pressure ring to compress the plate 3 between the pressure ring and the flywheel, the springs 7 being compression springs encircling the studs and thrusting in opposite directions against the pressure ring and heads 8 on the outer ends of the studs or interposed washers or abutments 9 thrusting against the heads 8.

The throw-out means are usually radially extending levers 10 pivoted at their outer ends at 11 to the pressure ring and having angularly extending arms 12 slidably pressing against the flywheel 1 so as to thrust with a camming action, the pressure ring rearwardly or to the right against the action of springs 7 to release the clutch when the levers are so operated by a conventional throw-out collar 13 slidable on the clutch shaft 4. The levers are provided with suitable anti-rattling springs 14. The pressure ring is here shown as formed with radial notches 15 in its margin in which the levers are pivoted.

In some types of machines, as agricultural machines, power lawn mowers, and the like, it is desirable to lock the clutch disengaged, and in order to do this, the angular arms 120 of the levers may be at such an angle as shown in Figure 3 as to move through or slightly beyond a dead center line A—A, passing through the axes of the levers 120 perpendicular to the face of the flywheel or analogous part, where the ends of the arms of the levers slidably coact therewith. In such a self-locking or over-the-center lever, the inner ends of the levers are located in a groove 16 in the throw-out collar, and the throw-out collar is operated into both normal position and throw-out position by its control lever. The control lever is usually a manual lever instead of a pedal when the self-locking feature is provided. When in self-locking position, it is necessary to give a starting impulse to the manual lever to bring the angular arms 120 back through the dead center lines, so that the springs 7 are free to re-act.

This clutch is particularly advantageous in that the pressure ring, the springs, clutch levers and the support by which the pressure ring is applied to the flywheel or analogous part to rotate therewith are a unitary structure and readily applied to the flywheel and also readily assembled into unitary form. In other words, the supporting means or studs support and drive the pressure ring from, and attach the same to the complemental element or driving section 1 and constitute the solid support for the pressure ring 2, and the springs are also carried solely by the supporting means or studs.

What I claim is:

A unitary friction clutch element for attachment to a complemental clutch element, the unitary element including a shiftable pressure ring, means for solely supporting and driving the pressure ring from, and attaching the same to the complemental element, springs located to thrust the pressure ring toward the complemental element and carried by the supporting means, and throw-out mechanism including throw-out levers carried solely by the pressure ring and having arms located to thrust directly against the complemental element during the throw-out operation to facilitate disengaging of the clutch, said arms frictionally and slidably coacting with the complemental element.

CHARLES B. SPASE.

REFERENCES CITED

The following references are of record in the file of this patent:

UNITED STATES PATENTS

| Number | Name | Date |
|---|---|---|
| 321,656 | Stalterfoht | July 7, 1885 |
| 940,970 | Hovey et al. | Nov. 23, 1909 |
| 1,527,607 | Rundell | Feb. 24, 1925 |
| 2,077,154 | Pearmain | Apr. 13, 1937 |
| 2,236,652 | Shurts et al. | Apr. 1, 1941 |
| 2,239,968 | Meech | Apr. 29, 1941 |